(12) United States Patent
Chen et al.

(10) Patent No.: US 9,825,850 B2
(45) Date of Patent: Nov. 21, 2017

(54) NETWORK CONTROLLING METHOD AND NETWORK CONTROLLER

(71) Applicant: INDUSTRIAL TECHNOLOGY RESEARCH INSTITUTE, Hsinchu (TW)

(72) Inventors: Yen-Chiu Chen, Hsinchu (TW); Kuang-Yi Li, Taipei (TW); Yuan-Jia Lin, Taichung (TW); Shi-Wei Lee, Minxiong Township, Chiayi County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 80 days.

(21) Appl. No.: 14/981,900

(22) Filed: Dec. 28, 2015

(65) Prior Publication Data

US 2017/0005906 A1    Jan. 5, 2017

(30) Foreign Application Priority Data

Jun. 30, 2015 (TW) .............................. 104121084 A
Nov. 13, 2015 (CN) ........................... 2015 1 0776085

(51) Int. Cl.
*H04L 12/28* (2006.01)
*H04L 12/715* (2013.01)
(Continued)

(52) U.S. Cl.
CPC .............. *H04L 45/64* (2013.01); *H04L 45/48* (2013.01); *H04L 12/4641* (2013.01);
(Continued)

(58) Field of Classification Search
CPC ......... H04L 45/02; H04L 45/64; H04L 45/66; H04L 49/70; H04L 49/351; H04L 12/4641; H04L 12/751; H04L 12/46; H04L 12/931
See application file for complete search history.

(56) References Cited

U.S. PATENT DOCUMENTS 8,605,734 B2    12/2013  Ichino
8,811,212 B2    8/2014   Beheshti-Zavareh et al.
(Continued)

FOREIGN PATENT DOCUMENTS

CN    103782552 A    5/2014
CN    103888369 A    6/2014
(Continued)

OTHER PUBLICATIONS

Taiwanese Office Action dated Jul. 1, 2016.
(Continued)

*Primary Examiner* — Andrew Lee
(74) *Attorney, Agent, or Firm* — Rabin & Berdo, P.C.

(57) ABSTRACT

A network controlling method and a network controller are provided. The network controlling method includes the following steps. A hybrid SDN-Ethernet system including a plurality of hosts, a plurality of Ethernet switches and m Software-defined networking switches (SDN switches) is provided. m is larger than or equal to 1. A first path according to at least one default spanning tree in the hybrid SDN-Ethernet system is obtained. m×k optional paths are obtained. Each of the m SDN switches is set as a beginning of each of k of the m×k optional paths. A second path is selected according to the m×k optional paths and the first path of the at least one default spanning tree.

13 Claims, 15 Drawing Sheets

(51) Int. Cl.
*H04L 12/753* (2013.01)
*H04L 12/721* (2013.01)
*H04L 12/931* (2013.01)
*H04L 12/46* (2006.01)
*H04L 12/801* (2013.01)
*H04L 12/803* (2013.01)

(52) U.S. Cl.
CPC .............. *H04L 45/66* (2013.01); *H04L 47/12* (2013.01); *H04L 47/125* (2013.01); *H04L 49/351* (2013.01); *H04L 49/354* (2013.01)

(56) References Cited

U.S. PATENT DOCUMENTS

| | | | |
|---|---|---|---|
| 9,042,234 | B1 | 5/2015 | Liljenstolpe et al. |
| 2013/0028073 | A1 | 1/2013 | Tatipamula et al. |
| 2013/0223277 | A1 | 8/2013 | DeCusatis et al. |
| 2013/0223440 | A1 | 8/2013 | DeCusatis et al. |
| 2013/0266007 | A1 | 10/2013 | Kumbhare et al. |
| 2013/0315580 | A1 | 11/2013 | Boertjes et al. |
| 2013/0329734 | A1* | 12/2013 | Chesla ................ H04L 45/74 370/392 |
| 2014/0153443 | A1* | 6/2014 | Carter ................ H04L 45/54 370/256 |
| 2014/0192645 | A1 | 7/2014 | Zhang et al. |
| 2014/0269415 | A1 | 9/2014 | Banavalikar et al. |
| 2014/0325649 | A1 | 10/2014 | Zhang |
| 2015/0012621 | A1* | 1/2015 | Patwardhan ........ H04L 41/0803 709/220 |
| 2015/0043383 | A1 | 2/2015 | Farkas et al. |
| 2015/0043589 | A1* | 2/2015 | Han ................ H04L 45/38 370/392 |
| 2015/0058977 | A1* | 2/2015 | Thompson .......... H04L 63/1416 726/22 |
| 2015/0372929 | A1* | 12/2015 | Rochwerger ............ H04L 45/38 709/238 |
| 2016/0057054 | A1* | 2/2016 | Lumezanu .............. H04L 45/48 370/256 |
| 2016/0112328 | A1* | 4/2016 | Anand .................... H04L 47/22 370/236.2 |
| 2016/0173329 | A1* | 6/2016 | Latham ............... H04L 41/0806 370/254 |
| 2016/0226701 | A1* | 8/2016 | Luo ......................... H04L 45/02 |
| 2016/0301593 | A1* | 10/2016 | Blair ................... H04L 12/4641 |
| 2016/0352653 | A1* | 12/2016 | Ranganathan .......... H04L 49/30 |
| 2016/0373359 | A1* | 12/2016 | Bruun ..................... H04L 47/20 |

FOREIGN PATENT DOCUMENTS

| | | |
|---|---|---|
| CN | 104253749 A | 12/2014 |
| EP | 2787698 A2 | 10/2014 |
| TW | I456950 B | 10/2014 |
| TW | 201524162 A | 6/2015 |

OTHER PUBLICATIONS

Sugam Agarwal et al., "Traffic Engineering in Software Defined Networks", Proceedings IEEE INFOCOM, 978-1-4673-5946-7/13 © 2013 IEEE, pp. 2211-2219, 2013.

David Allan et al., "Intelligent Load Balancing for Shortest Path Bridging", 0163-6804/12 © 2012 IEEE, IEEE Communications Magazine, pp. 163-167, Jul. 2012.

Dorabella Santos et al., "Optimization of link load balancing in multiple spanning tree routing networks", Telecommun Syst (2011) 48:109-124 DOI 10.1007/s11235-010-9337-8, 2011.

Ghasem Mirjalily et al., "Load Balancing in Metro Ethernet Networks by Selecting the Best Spanning Tree", proceeded by International Conference on Computer and Information Technology, Jul. 2008, Sydney, Australia, pp. 1747-1759, Journal of Information Science and Engineering 27, 1747-1759 (2011).

Steven S. W. Lee et al., "Modeling and Algorithm for Multiple Spanning Tree Provisioning in Resilient and Load Balanced Ethernet Networks", Hindawi Publishing Corporation Mathematical Problems in Engineering vol. 2015, Article ID 676542, 10 pages http://dx.doi.org/10.1155/2015/676542, pp. 1-11, 2015.

Amaro F. de Sousa et al., "Improving Load Balance and Minimizing Service Disruption on Ethernet Networks with IEEE 802.1S MSTP", pp. 1-11, proceeded by EuroFGI Workshop on IP QoS and Traffic Control P. Pereira (Ed.) Lisbon, Portugal, Dec. 6-7, 2007.

"Virtual Bridged Local Area Networks—Amendment 3: Multiple Spanning Trees", IEEE Standards for Local and metropolitan area networks, IEEE Std 802.1s™-2002 (Amendment to IEEE Std 802.1Q™, 1998 Edition), pp. 1-211, Dec. 31, 2002.

\* cited by examiner

NETWORK CONTROLLING METHOD AND NETWORK CONTROLLER

This application claims the benefits of Taiwan application Serial No. 104121084, filed Jun. 30, 2015, and People's Republic of China application Serial No. 201510776085.7, filed Nov. 13, 2015, the disclosures of which are incorporated by reference herein in its entirety.

TECHNICAL FIELD

The disclosure relates in general to a controlling method and a controller, and also relates to a network controlling method and a network controller.

BACKGROUND

Along with the development of the information technology, the network communication is continuously progressed. For example, Ethernet switches are widely used due to the advantages of high speed, low cost and plug-and-play function.

Software Defined Networking (SDN) is an emerging technology used to provide more flexible controls on networks by abstracting lower-level switch functionality. In SDN, the control plane and data plane are separate. The controller directly manages SDN aware devices via a well-defined interface and control protocol. The central control paradigm of SDN enables the controller to utilize network resources efficiently and facilitate QoS differentiation for services through network-wide optimization.

SUMMARY

The disclosure is directed to a network controlling method and a network controller.

According to one embodiment, a network controlling method is provided. A hybrid SDN-Ethernet system including a plurality of hosts, a plurality of Ethernet switches and m Software-defined networking switches (SDN switches) is provided. m is larger than or equal to 1. A first path is obtained according to at least one default spanning tree in the hybrid SDN-Ethernet system. m×k optional paths are obtained. Each of the m SDN switches is set as a beginning of each of k of the m×k optional paths. A second path is selected according to the m×k optional paths and the first path of the at least one default spanning tree.

According to another embodiment, a network controller is provided. The network controller is disposed in a hybrid SDN-Ethernet system. The hybrid SDN-Ethernet system includes a plurality of hosts, a plurality of Ethernet switches and m Software-defined networking switches (SDN switches), wherein m is larger than or equal to 1. The network controller includes a processing unit and a storage unit. The processing unit is for obtaining a first path according to at least one default spanning tree in the hybrid SDN-Ethernet system, obtain m×k optional paths, and select a second path according to the m×k optional paths and the first path of the at least one default spanning tree. Each of the m SDN switches is set as a beginning of each of k of the m×k optional paths. The storage unit is for storing the m×k optional paths.

Figure 1:
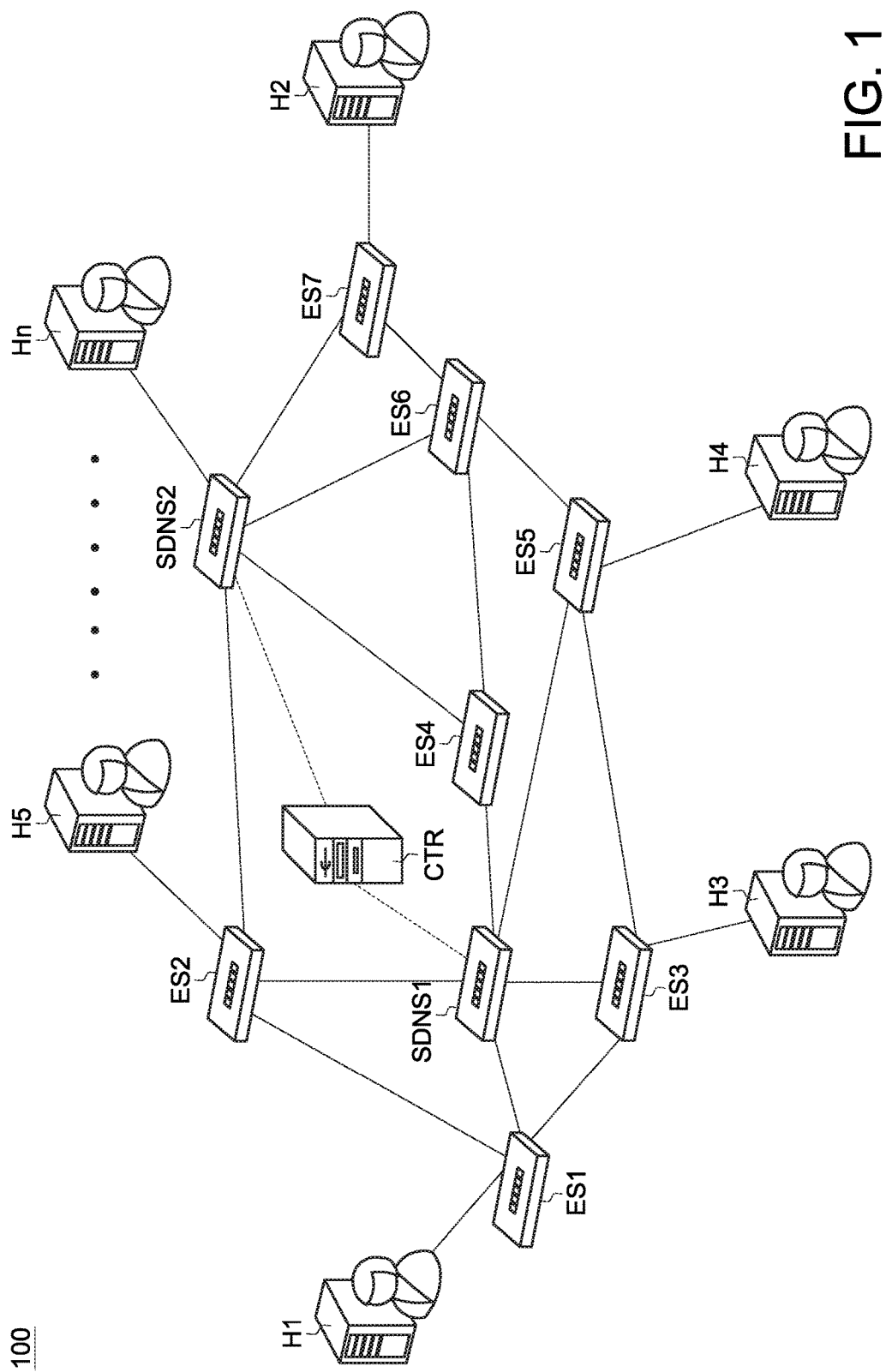
FIG. 1 shows a hybrid SDN-Ethernet system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

For purposes of explaining the technology and the advantages of the present disclosure, several embodiments are provided with drawings.

Ethernet has the advantages of high speed and low cost. The autoconfiguration capability of Ethernet also support the network to realize a plug-and-play function. Ethernet is widely used in a local area network including a data center, an Enterprise network, and home networks. A minimum spanning tree is constructed in the Ethernet system according to the 802.3 spanning tree protocol (STP). Packets are transmitted in the Ethernet system along this minimum spanning tree only. Some links which are not belonged to this minimum spanning tree are blocked for preventing from the traffic loop.

Software Defined Networking (SDN) is an emerging technology used to provide more flexible controls on networks by abstracting lower-level switch functionality. In SDN, the control plane and data plane are separate. The controller directly manages SDN aware devices via a well-defined interface and control protocol. The central control paradigm of SDN enables the controller to utilize network resources efficiently and facilitate QoS differentiation for services through network-wide optimization. OpenFlow is the most popular technology for implementing SDN. OpenFlow protocol (OFP) is a communication protocol used between the network controller and the OpenFlow switches. In one embodiment, the SDN switches and SDN controller can be realized using commodity OpenFlow switches as well as an OpenFlow controller.

FIG. 1 shows a hybrid SDN-Ethernet system 100. The hybrid SDN-Ethernet system 100 includes a plurality of Ethernet switches, such as the Ethernet switches ES1 to ES7, a plurality of SDN switches, such as the SDN switches SDNS1 and SDNS2, and a network controller CTR. In FIG. 1, each solid line indicates a physical link, and each dotted line indicates a control plane of the network controller CTR.

The Ethernet system can include a plurality of hosts. The figure in FIG. 1 includes a first host H1, a second host H2, a third host H3, a fourth host H4, a fifth host H5, . . . , a N-th host Hn. A plurality of spanning trees can be constructed among the switches according to the Multiple Spanning Tree Protocol (MSTP).

At beginning, in the hybrid SDN-Ethernet system 100, spanning trees are provisioned according to the estimated flow of the nodes among the hosts. The estimated flow of the nodes can be obtained according the history data or the actual measurement. That is to say, the spanning trees in the hybrid SDN-Ethernet system 100 can be updated according to the flow of the nodes after performing a period of time.

The operation setting of the Ethernet system is used in the hybrid SDN-Ethernet system 100. The Ethernet packets transmitted from the host, such as the first host H1 or the second host H2, do not carry the Virtual Local Area Network identification (VLAN ID). The VLAN ID is attached to the packet at the ingress switch, e.g. Ethernet switch ES1 in FIG. 1. The VLAN ID is removed by the egress switch, such as the Ethernet switch ES7, where the packet leaves the hybrid SDN-Ethernet system 100.

According to the MSTP, one or more than one spanning tree instances can be used in the Ethernet system. In each of the instances, a minimum spanning tree is obtained according to an assigned weight of each link. Therefore, there can be several minimum spanning trees to provide different paths in the Ethernet system. The packets are transmitted along the minimum spanning tree according to the VLAN ID. Therefore, by changing the VLAN ID, an alternate routing path can be selected. In detail, each ingress port of an Ethernet switch is configured with a particular VLAN ID. When one packet is transmitted from a host into the ingress port of an Ethernet switch, the VLAN ID is attached and the packet is transmitted along the minimum spanning tree corresponding to the VLAN ID. The commodity SDN switches SDNS1 and SDNS2 may not support the MSTP. To enable SDN switches joining the configuration of multiple spanning trees, in the present embodiment, the network controller CTR is responsible for performing MSTP protocol on behalf of the SDN switches SDNS1 and SDNS2. More specifically, when the SDN switches SDNS1 and SDNS2 receive the BPDUs from an Ethernet switch, the SDN switches SDNS1 to SDNS2 transmit the BPDU to the network controller CTR. For an OpenFlow switch, the process to transmit the BPDU packets to the controller is realized using standard packet-in event mechanism. The controller CTR processes the BPDU packets according to the MSTP protocol. Any response BPDU packets are transmitted back to the SDN switch that is then transmitted to the neighbor nodes of the SDN switches. For a SDN switch, the network controller CTR uses packet-out message to ask the SDN switch to deliver the response BPDU to its neighbor node. As such, even if the SDN switches SDNS1 and SDNS2 do not support the MSTP, the SDN switches SDNS1 and SDNS2 still can be joined into the spanning tree. As shown in FIG. 1, the first host H1 and the second host H2 perform a communication. Packets are transmitted from the first host H1 to the second host H2. The first host H1 is connected to the Ethernet switch ES1. We denote "x" the VLAN ID that recorded at the ingress port of the Ethernet switch ES1 for attaching the VLAN ID to the packets incoming from H1. That is to say, one packet transmitted from the first host H1 to the Ethernet system is attached with VLAN ID "x." In one embodiment, the Ethernet system may have i spanning trees. For illustration, VLAN ID x is binding to the first spanning tree. The packets transmitted from the first host H1 into the Ethernet system is transmitted according to the first instance. That is to say, packets transmitted from the first host H1 to the second host H2 will be transmitted along the path of the spanning tree between the Ethernet switch ES1 and the Ethernet switch ES7. We call the routing path between the first host H1 and the second host H2 provided by the first spanning tree to connecting packets with VLAN ID x the default path. The spanning tree in the hybrid SDN-Ethernet system 100 provides a default path which can be used to transmit packets without any modification on the VLAN ID. Moreover, k optional paths are formed between each SDN switch and the Ethernet switch connected to a host. Each optional path is associated with different VLAN ID. When the default path is congested, by changing the VLAN ID for the packets going through a SDN switch (i.e., the SDN switch SDNS1 or the SDN switch SDNS2), one of the k optional paths can be selected for traffic rerouting as to prevent the network congestion.

Figure 2:
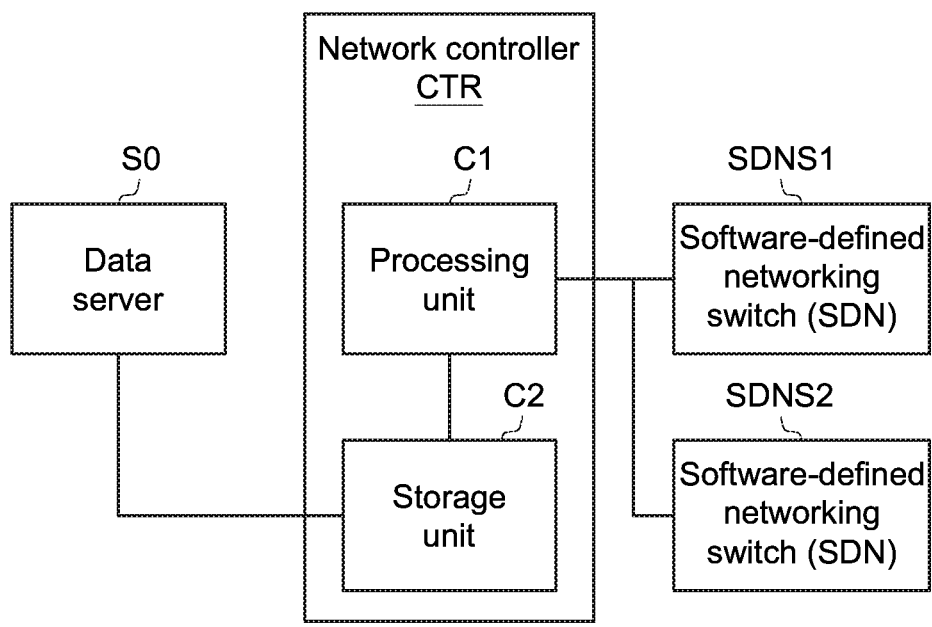
FIG. 2 shows a network controller, a plurality of SDN switches and a data server.

FIG. 2 shows the network controller CTR, the SDN switches SDNS1, SDNS2 and a data server S0. The data server S0 collects and transmits the load of each link to the network controller CTR. The network controller CTR can change the path according the network state (for example, one link is congested), such that the dynamic load balance can be achieved. A flowchart in FIG. 3 is used to illustrate how to achieve the dynamic load balance according to the hybrid SDN-Ethernet system 100.

In another embodiment, the function of the network controller CTR can be expanded to include the data server S0. In this case, the network controller CTR can directly collect the load of each link.

Figure 3:
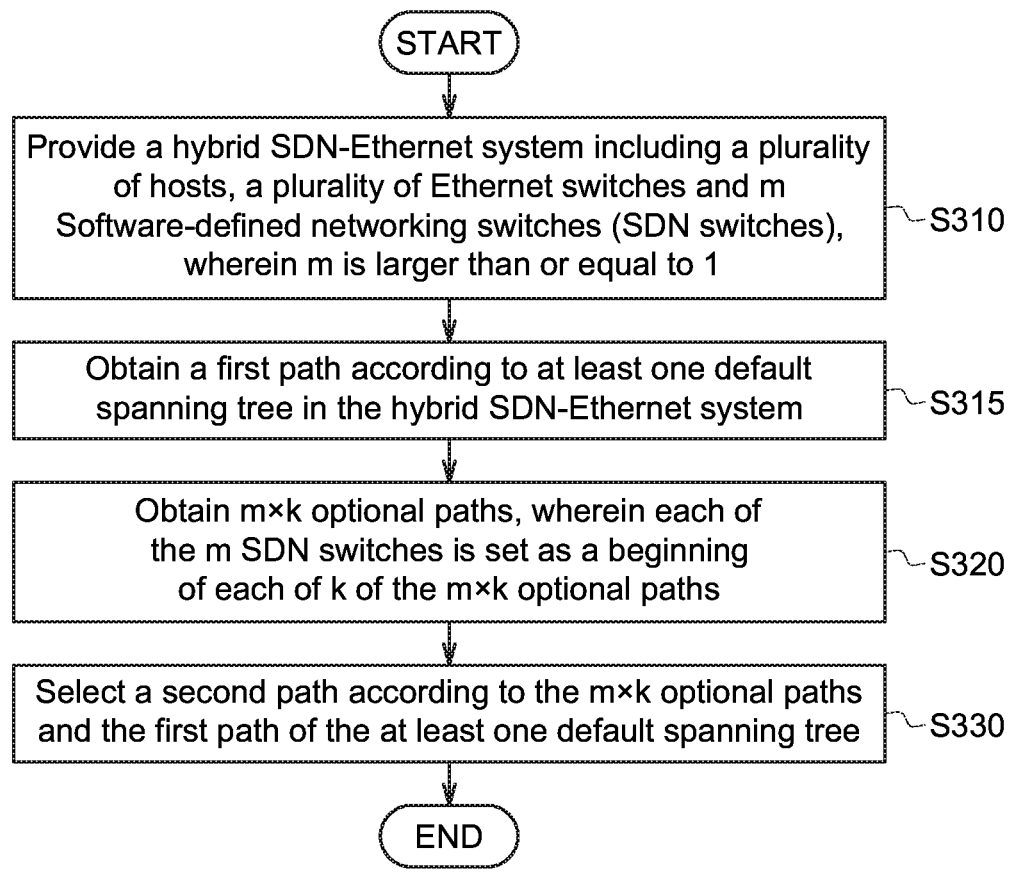
FIG. 3 shows a flowchart of the network controlling method according to an embodiment.

FIG. 3 shows a flowchart of the network controlling method according to an embodiment. In step S310, the hybrid SDN-Ethernet system includes a plurality of hosts, a plurality of Ethernet switches, such as the Ethernet switches ES1 to ES7, and m SDN switches, such as SDN switches SDNS1 and SDNS2, to form the hybrid SDN-Ethernet system 100, wherein m is an integer which is larger than or equal to 1.

In step S315, the network controller CTR obtains a first path according at least one default spanning tree between the hosts in the hybrid SDN-Ethernet system. The first path which is a default path among the nodes is provided according to the default spanning tree. In one embodiment, the default spanning for a pair of source host (the first host H1) and destination host (the second host H2) is the one that includes the VLAN ID assigned to the ingress port of the source host (the first host H1). The routing path in the default spanning tree to connect the source host (the first host H1) and the destination host (the second host H2) is the default path. The network is assigned multiple spanning trees. Each tree can bind multiple VLAN IDs. Those spanning trees provide optional routing paths for a source and destination. In step S320, m×k optional paths are obtained. Each of the m SDN switches is set as a beginning of each of k of the m×k optional paths. The m SDN switches on the default path is connected to the m×k optional paths to form a multiple-layers graph.

Figure 4:
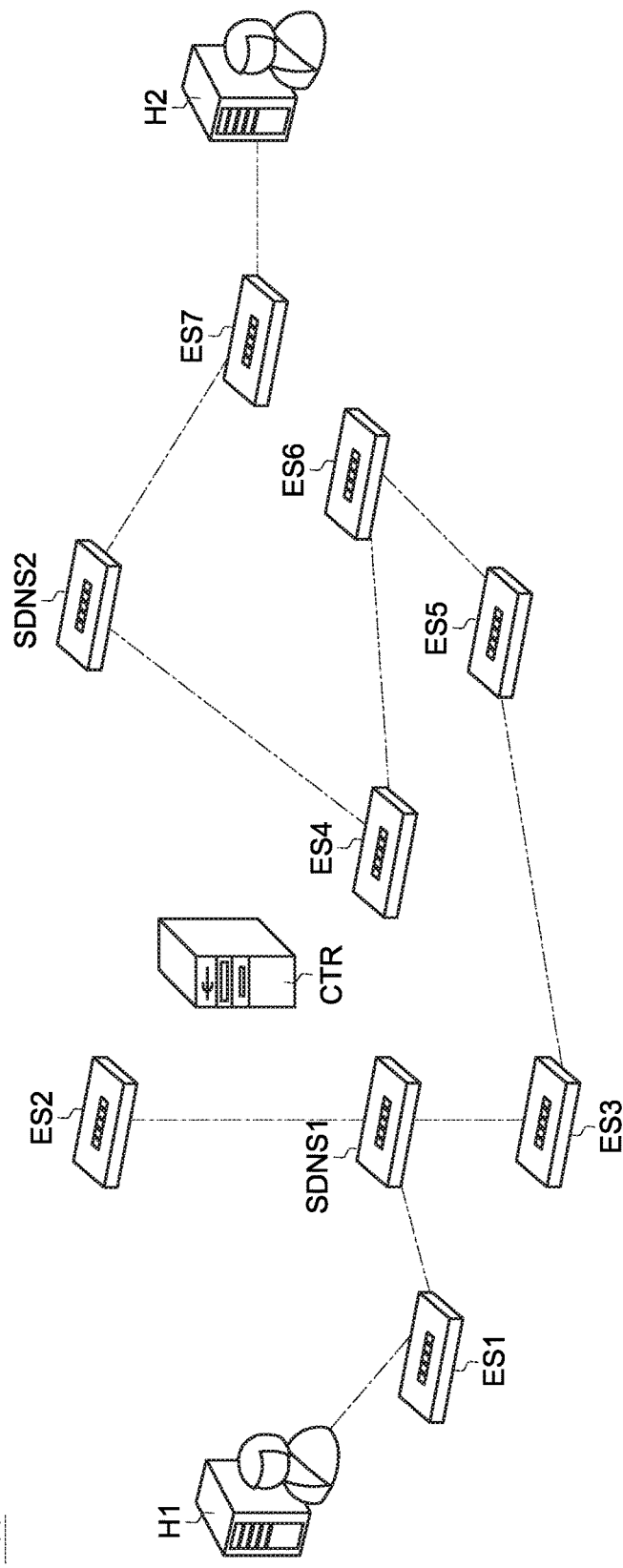
FIG. 4 shows a default minimum spanning tree of the hybrid SDN-Ethernet system.

Each of the m×k optional paths is included in a spanning tree instance. Each of the optional paths corresponds to a VLAN ID. The switches, including Ethernet switches and SDN switches, along the optional paths have to be configured such that the VLAN ID is only assigned to all of the ports of the switches on the optional path. The VLAN ID is not assigned to the two end ports of a tree link which is not included in the optional path. The purpose of doing so is that a switch won't generate broadcast packets even there is an incoming packet with unknown destination MAC. When the SDN switch changes the path, the selected optional path is a unicast path and there is only one output port for any switch along the optional path. As a result, there is no packet broadcasting after rerouting from a default path to an optional path. FIG. 4 shows the default minimum spanning tree of the hybrid SDN-Ethernet system 100. In step S330, when the packet is transmitted from the first host H1 to the second host H2, the packet will transmitted along the default path in the default minimum spanning tree. If the intermediate SDN switch SDNS1 does not recognize this packet, the SDN switch SDNS1 generates a packet-in event and transmits the packet to the network controller CTR. The network controller CTR selects one of the k+1 paths starting from the SDN switch SDNS1 to the Ethernet switch (or the SDN switch) connected to the second host H2. Accordingly, a flow entry corresponding to the selected path is configured to the flow table of the SDN switch SDNS1. In this embodiment, the Ethernet switch ES7 is connected to the second host H2. The k+1 paths include one default path P0 and two optional paths P11 and P12 (shown in FIG. 5).

The packet is transmitted to the SDN switch SDNS2. If the SDN switch SDNS2 does not recognize this packet, the SDN switch SDNS2 generates the packet-in event, and transmits the packet to the network controller CTR. The network controller CTR selects one of the k+1 paths starting from the SDN switch SDNS2 to the Ethernet switch (or the SDN switch) connected to the second host H2. Accordingly, a flow entry corresponding to the selected path is configured to the flow table of the SDN switch SDNS2. In this embodiment, the Ethernet switch ES7 is connected to the second host H2. The k+1 paths include one default path P0 and two optional paths P21 and P22 (shown in FIG. 5).

Therefore, the processing unit C1 of the network controller CTR obtains 2×k optional paths according to the Ethernet switches ES1 to ES7 and the SDN switches SDNS1 and SDNS2 from the first host H1 to the Ethernet switch (or the SDN switch) connected to the second host H2. The default path P0 and the 2×k optional paths form two path layers (shown in FIG. 5) for selecting a second path.

Figure 5:
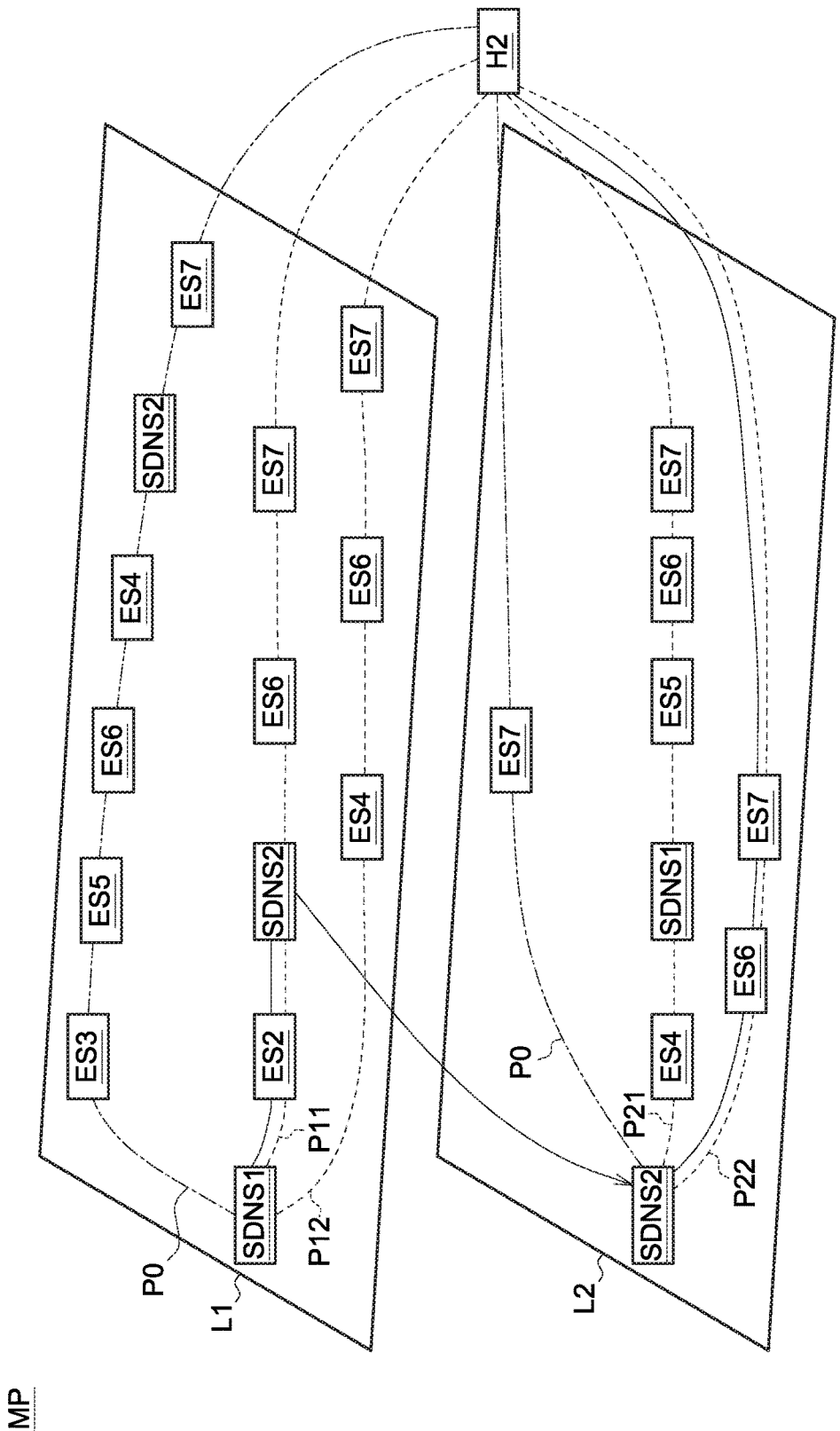
FIG. 5 shows a default path and a plurality of optional paths.

FIG. 5 shows the default path P0 and optional paths P11, P12, P21 P22. To simplify the description, k is 2 in this embodiment. In step S320, the processing unit C1 obtains the optional paths P11, P12, P21, P22 according to a K-best paths algorithm, a K-shortest paths algorithm or a K-disjoint paths algorithm. Each of the optional paths P11, P12, P21, P22 is a path from one of the m SDN switches SDNS1, SDNS2 to the Ethernet switch (or the SDN switch) connected to the second host H2. The value of k is used to set the number of the optional paths according to those algorithms.

When the packet is transmitted from the first host H1 to the second host H2, one of the optional paths P11 and P12 from the SDN switch SDNS1 to the Ethernet switch ES7 is selected. Because the optional path P11 goes through the SDN switch SDNS2, the path can be changed to the optional paths P21 and P22 via the SDN switch SDNS2. Each of the optional paths P11, P12, P21, P22 is a unicast path and has a particular VLAN ID. For example, the VLAN ID of the optional path P11 may be set as "y." In one embodiment, an instance is needed to be generated for obtaining each of the optional paths P11, P12, P21, P22. For example, an (i+1)th instance is generated for the optional path P11. The (i+1)th spanning tree includes the following links of the optional path P11: "the link between the SDN switch SDNS1 and the Ethernet switch ES2", "the link between the Ethernet switch ES2 and the SDN switch SDNS2", "the link between the SDN switch SDNS2 and the Ethernet switch ES6", "the link between the Ethernet switch ES6 and the Ethernet switch ES7." The VLAN ID y is only set to the above-mentioned links of the optional P11 not to P12, P21 and P22.

Please referring to FIG. 5, there are two optional paths P11, P12 from the SDN switch SDNS1 to the Ethernet switch ES7 connected to the second host H2. The default path P0 and the optional paths P11, P12 form the path layer L1. There are two optional paths P21, P22 from the SDN switch SDNS2 to the Ethernet switch ES7 connected to the second host H2. The default path P0 and the optional path P21, P22 form another path layer L2. The default path P0 and the four (m×k) optional paths P11, P12, P21, P22 form a multiple-layers graph MP. The multiple-layers graph MP can be stored in the storage unit C2 of the network controller CTR, and the network controller CTR dynamically selects a suitable path (i.e, a second path) according to network state to achieve load balance and congestion avoidance.

The processing unit C1 can be a CPU, a micro-processor or an embedded controller. The processing unit C1 can be realized by microprocessor, a microcontroller, a DSP chip, a FPGA. The processing unit C1 can be implemented by an electronic device or an IC. The processing unit C1 can be implemented by hardware or software.

The storage unit C2 can be a memory, a static random-access memory (SRAM), a dynamic random access memory (DRAM) or a hard disk.

The optional path P11 of the path layer L1 is a path from the SDN switch SDNS1 to the Ethernet switch ES7 connected to the second host H2. Each of the paths P21, P22 of the path layer L2 is a path from the SDN switch SDNS2 to the Ethernet switch ES7 connected to the second host H2. The optional path P11 of the path layer L1 includes the SDN switch SDNS2, therefore, the optional path P11 of the path layer L1 can be connected to one of the optional paths P21, P22 of the path layer L2 by the SDN switch SDNS2 in the path layer L1. That is to say, the path layer L1 can be connected to the path layer L2 via the SDN switch SDNS2. According to this multiple-layers graph MP, the network controller CTR can select the paths according to the network state for dynamic load balance.

In step S330, a second path according to the m×k optional paths and the first path of the at least one default spanning tree is selected. In the Ethernet system, if a new flow is transmitted from the first host H1 to the second host H2, and the SDN switch SDNS1 or the SDN switch SDNS2 receives a packet which cannot be recognized, the SDN switch SDNS1 or the SDN switch SDNS2 transmits a packet-in message to the network controller CTR for informing the network controller CTR that a new flow is received. The network controller CTR obtains the default path P0 and four (m×k) optional paths P11, P12, P21, P22 from the SDN switch SDNS1 or the SDN switch SDNS2 to the Ethernet switch ES7 connected to the second host H2. For example, from the SDN switch SDNS1 to the Ethernet switch ES7 connected to the second host H2, there are one default path P0 and two (k) optional paths P11, P12. The processing unit C1 of the network control CTR selects the second path according to the network state, and generates a routing table according to the second path. The processing unit C1 of the network controller CTR selects the second path according to the network state. The routing metrics for path selection can include bandwidth utilization, the number of path hop count, and other traffic engineering indices. In this step, the processing unit C1 can selects the second path which is the best according to an Integer Linear Programming Algorithm (ILP Algorithm), a min-max fairness algorithm (MMF algorithm), a Fully Polynomial Time Approximation Scheme Algorithm (FPTAS Algorithm). The network controller CTR replaces the current path from the first host H1 to the second host H2 by the second path. Each of the optional paths is a unicast path. Each of the optional paths corresponds to one VLAN ID. Only the ports on the optional paths are assigned the VLAN ID. When the path is changed, the network controller sets the VLAN ID to the new path. Even if the Ethernet switch in the new path does not record the Media Access Control (MAC) address of the second host H2, the packet can be transmitted to the second host H2 by reading the VLAN ID of the new path without any flooding.

Figure 11A:
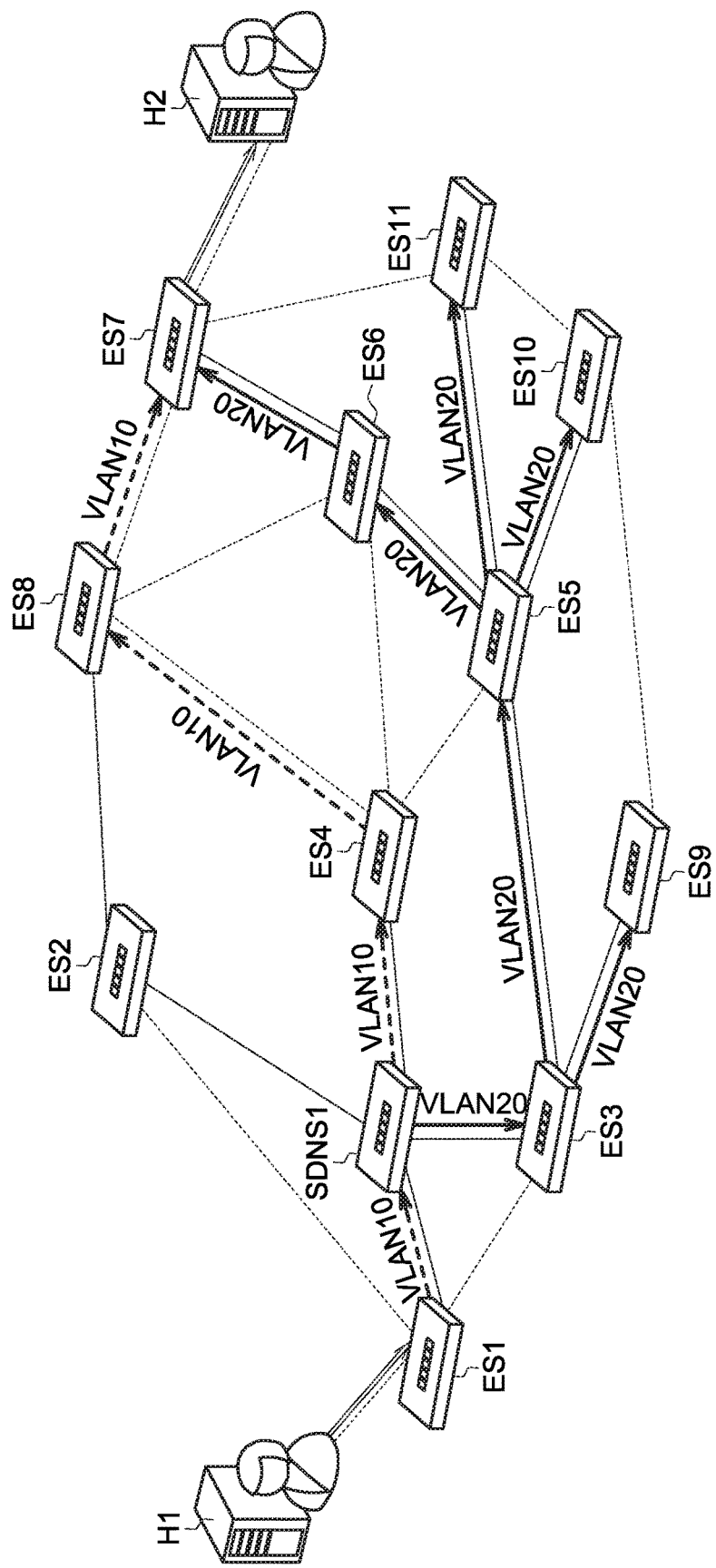
FIGS. 11A to 11B show some examples of flooding.
Figure 11B:
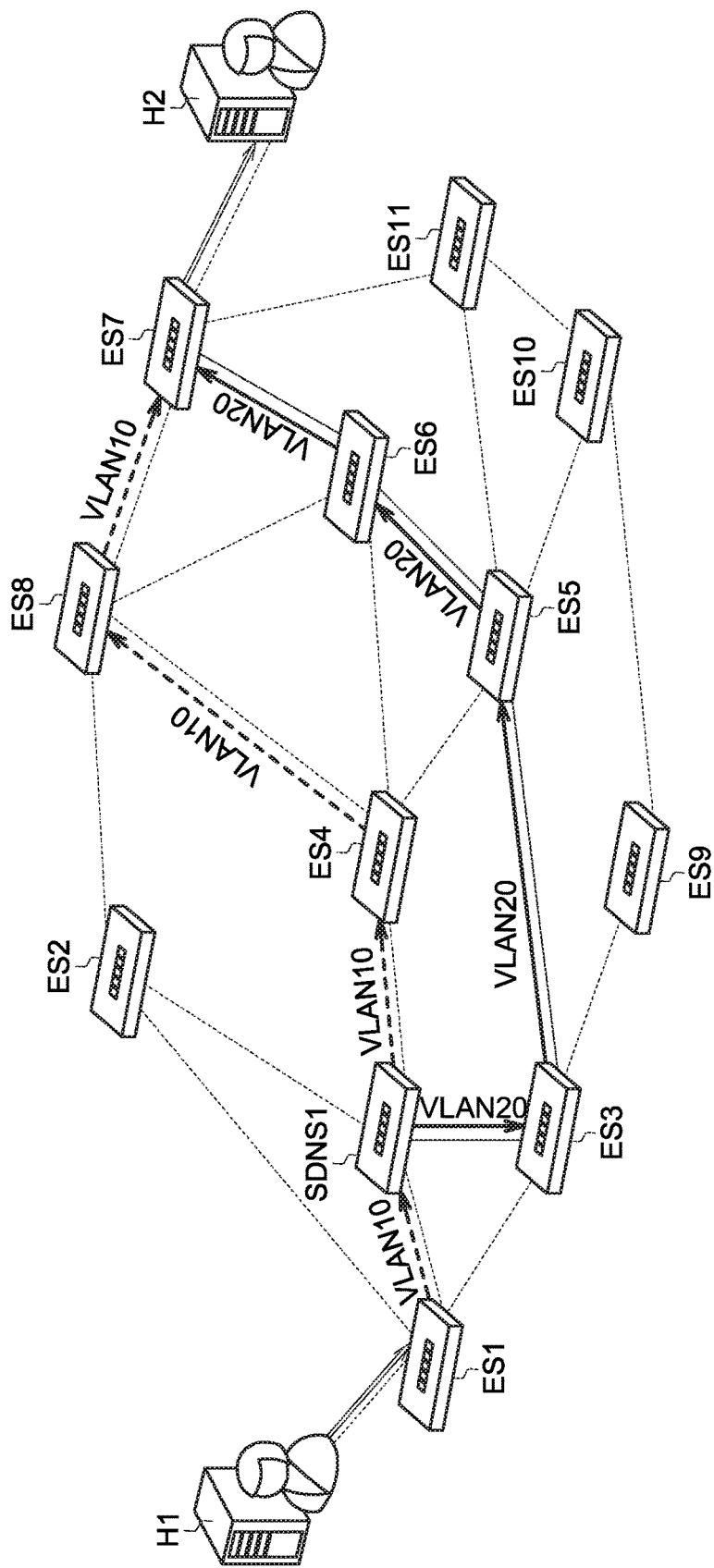

For example, please refer to FIGS. 11A to 11B. FIGS. 11A to 11B present examples for flooding avoidance. The solid line indicates the links of one spanning tree whose VLAN ID is "VLAN 20" where packets can be transmitted between the SDN switch SDNS1 and the Ethernet switch ES7. The dotted line indicates the other physical links connected between reminded SDN switches and Ethernet switches pairs. The dotted arrow and solid arrow indicate the links whose VLAN ID are "VLAN 10" and "VLAN 20" respectively from the SDN switch SDNS1 to the Ethernet switch ES7. The path from the second host H2 to the first host H1 is a reverse direction of dotted arrow. In those figures, the path whose VLAN ID is "VLAN 10" from the second host H2 to the first host H1 is not shown. In the case that the packet is transmitted from the first host H1 to the second host H2, the packet is attached "VLAN 10" at the Ethernet switch ES1 and then transmitted toward the SDN switch SDNS1. If the link from the SDN switch SDNS1 to the Ethernet ES4 is congested, the VLAN ID of the packet is replaced with "VLAN 20" and then switch to the path toward the Ethernet switch ES3. In FIG. 11A, the forwarding information base (FIB) in Ethernet switch ES3, the Ethernet switch ES5 and the Ethernet switch ES9 do not have the MAC address of the second H2. When the packet arrives the Ethernet switch ES3, the packet is broadcasted to the Ethernet switch ES5 and the Ethernet switch ES9. When the packet arrives the Ethernet switch ES5, the packet is broadcasted to the Ethernet switch ES6, the Ethernet switch ES10 and the Ethernet switch ES11. When the packet arrives the Ethernet switch ES6, the packet is broadcasted to the Ethernet switch ES7. The VLAN ID which is "VLAN 20" of the packet is removed by the Ethernet switch ES7 and the packet is transmitted to the second host H2.

To resolve this flooding problem, "VLAN 20" is binding to a unicast path "the SDN switch SDNS1, the Ethernet switch ES3, the Ethernet switch ES5, the Ethernet switch ES6, the Ethernet switch ES7", as shown in FIG. 11B.

Although the FIB of each of the Ethernet switch ES3, the Ethernet switch ES5, the Ethernet switch ES6 does not include the MAC address of the second host H2, it will not cause the broadcast flooding, because the packet is transmitted along the unicast path whose VLAN ID is "VLAN 20."

The network controller CTR transmits the packet from the first host H1 to the second host H2 along the second path. When the packet is transmitted from the second host H2 to the first host H1 along a path different from the path from the first host H1 to the second host H2, the network controller CTR controls the SDN switches SDNS1, SDNS2 to send the Layer 2 update message, and update the FIB of the Ethernet switches on the current path. Or, the network controller CTR can generate and transmit a packet to the SDN switch SDNS1 for updating the FIB of the Ethernet switches on the current path and preventing from the flooding where the information in the packet include the source address is the MAC address of the second host H2, and the destination address is the MAC address of the first host H1. The FIB is also called as a forwarding table.

Figure 12A:
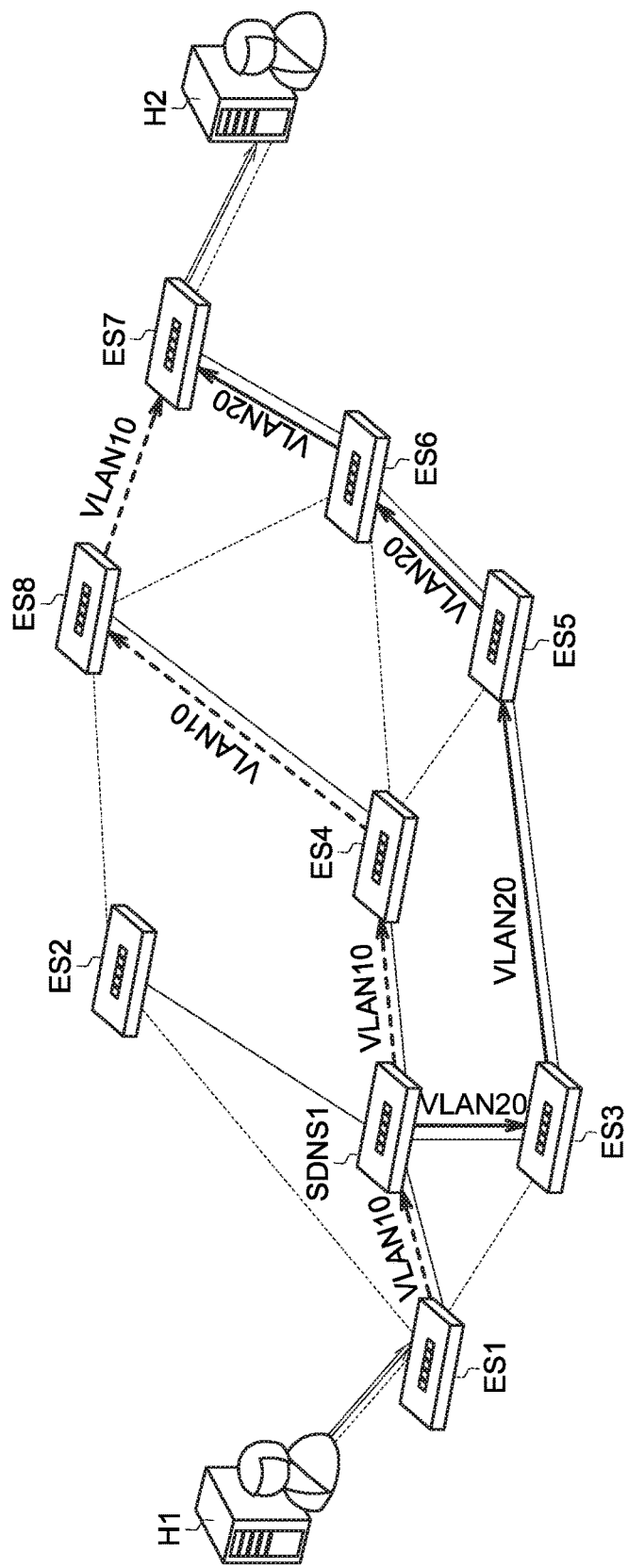
FIGS. 12A to 12B show another example of flooding in the backward path from the second host to the first host.
Figure 12B:
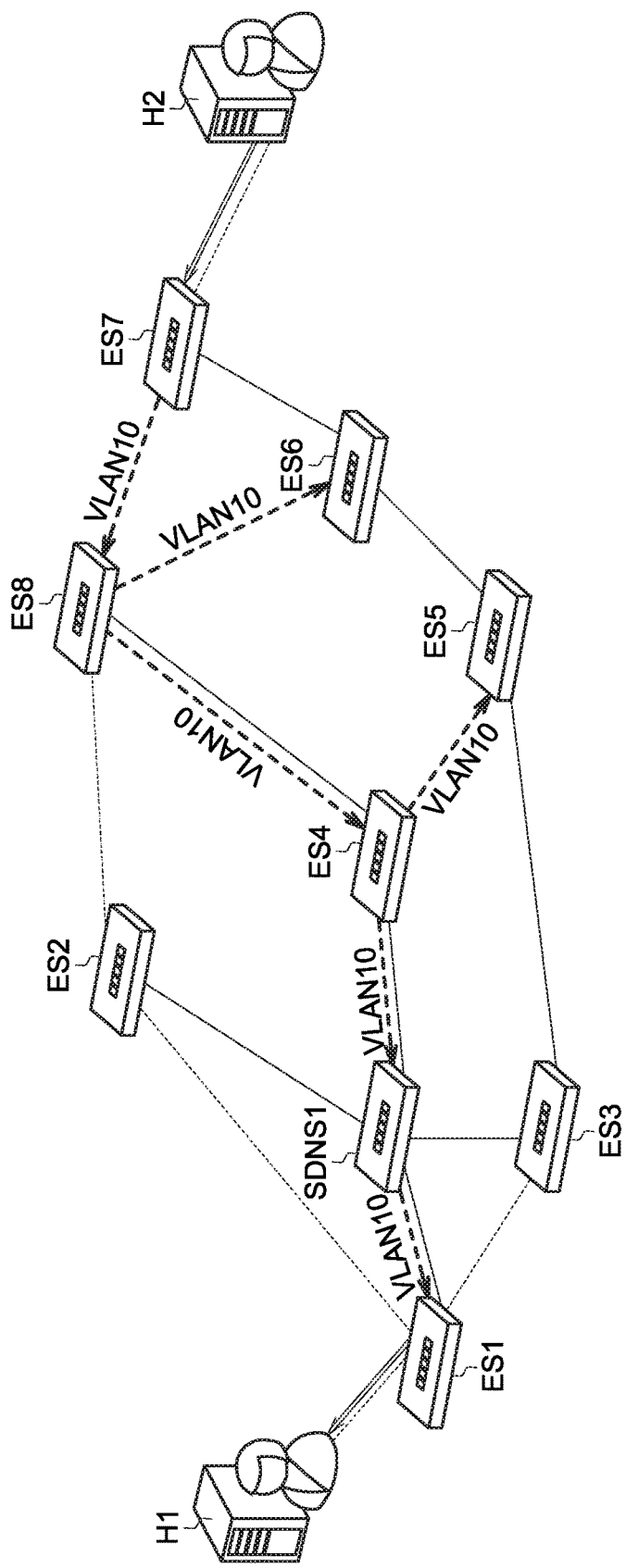

FIGS. 12A to 12B show another example of flooding in the backward path from the second host H2 to the first host H1. The solid line indicates the links of one spanning tree whose VLAN ID is "VLAN 20" where packets can be transmitted between the SDN switch SDNS1 and the Ethernet switch ES7. The dotted line indicates the other physical links connected between reminded SDN switches and Ethernet switches pairs. The dotted arrow indicates the links whose VLAN ID is "VLAN 10" from the SDN switch SDNS1 to the Ethernet switch ES7. In FIG. 12A, the network congestion happens at the direction from the SDN switch SDNS1 to the Ethernet switch ES4. The packet transmitted from the first host H1 to the second host H2 is switched to the path whose VLAN ID is "VLAN 20" at the SDN switch SDNS1. The packet transmitted back from the second host H2 to the first host H1 can be transmitted along the path whose VLAN ID is "VLAN 10." However, because the path from the first host H1 to the second H2 is switched to the new path, the Ethernet switch ES4, the Ethernet switch ES8 and the Ethernet switch ES7 do not learn the MAC address of the first host H1. The packet transmitted from the second host H2 to the first host H1 will be broadcasted due to the failure of searching the MAC address of the first host H1 in the FIB. As shown in FIG. 12B, when the packet arrives the SDN switch SDNS1, the package-in event is triggered. The network controller CTR sets the flow table of the SDN switch SDNS1 and generates a Layer 2 update message which including MAC address of the first host H1 to trigger the MAC learn in the Ethernet switch ES4, the Ethernet switch ES8 and the Ethernet switch ES7. This Layer 2 update message records that the VLAN ID is "VLAN 10" from the SDN switch SDNS1 to the second host H2. Thus, the Ethernet switch ES4, the Ethernet switch ES8 and the Ethernet switch ES7 can know the MAC address of the first host H1 for preventing the flooding.

Figure 13:
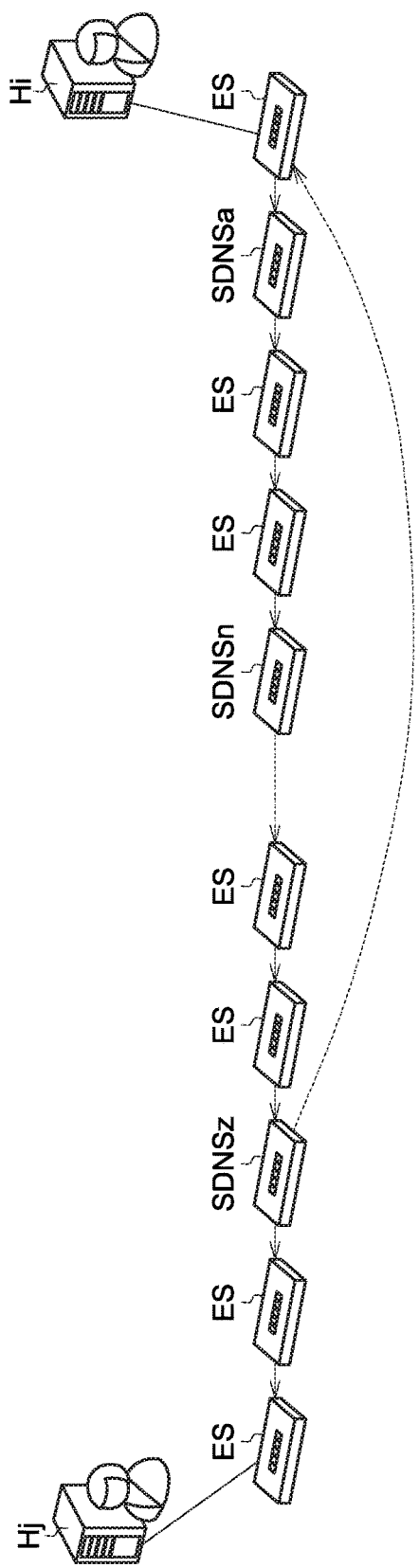
FIG. 13 shows the update rule of the FIB of the Ethernet switch.

Please refer to FIG. 13. FIG. 13 shows the update rule of the FIB of the Ethernet switch. From a host Hi to a host Hj, there are several SDN switches SDNSa, SDNSn, SDNSz along the default path. A new flow triggers a package-in event at the SDN switch SDNSa. A Layer 2 update message is transmitted from the first SDN switch on the default path. In backward path from the host Hj to the host Hi, the Layer 2 update message which records the resource MAC address is the MAC address of the host Hj is transmitted toward the host Hi for updating the FIB of all of the Ethernet switches between the SDN switch SDNSz and the host Hi. When the searching of the table of the SDN switch is failed, it is reported to the network controller CTR and the updating procedure is performed again at the SDN switch SDNSz. An idle timeout is set at a flow entry of the SDN switch. The time value of the idle timeout is less than that of the FIB, such that the flow entry of the SDN switch will be removed before removing the FIB. If the flow entry is removed, the packet arrived the SDN switch triggers the package-in event and the network controller CTR sends the Layer 2 update message accordingly.

Figure 6:
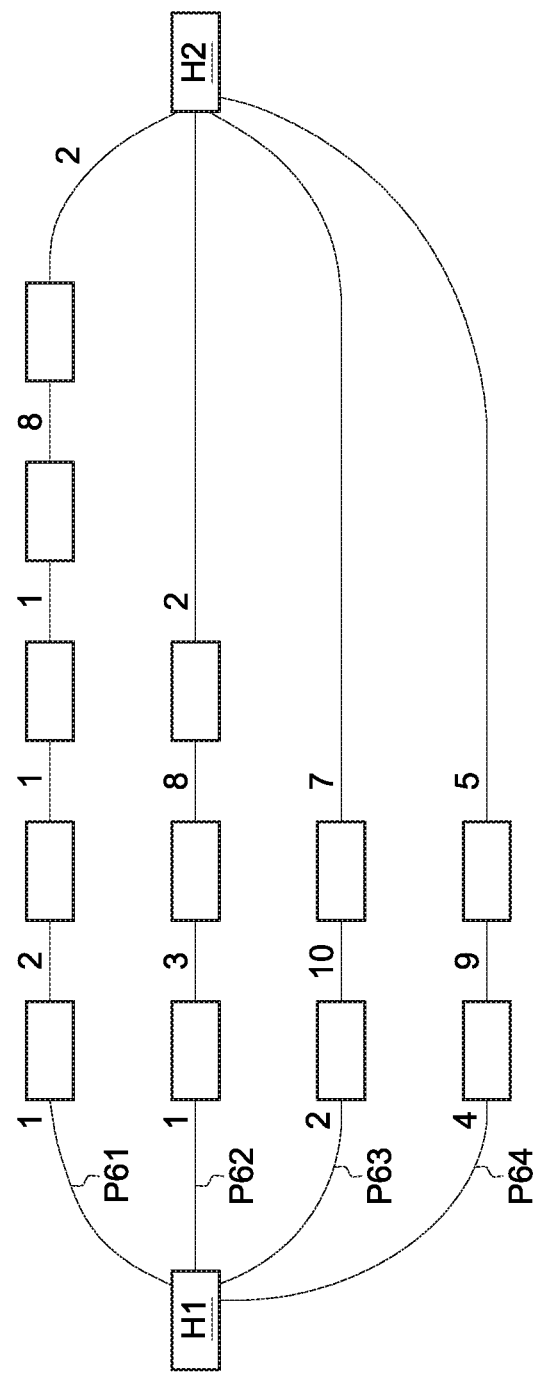
FIG. 6 shows the selection of the paths.

FIG. 6 shows the selection of the paths. In FIG. 6, there are four paths P61 to P64. The number on each link indicates the load. As shown in FIG. 6 and Table 1, the bandwidth utilizations on the most congested link of the paths P61 to P64 are "8, 8, 10, 9", respectively. The utilization of the paths P61 and P62 is lower than others.

TABLE 1

| | Bandwidth utilization on the most congested link | hot count | total bandwidth utilization |
|---|---|---|---|
| Path P61 | 8 | 5 | 15 |
| Path P62 | 8 | 3 | 14 |
| Path P63 | 10 | 2 | 19 |
| Path P64 | 9 | 2 | 18 |

Next, the hot count of the path P62 is less than that of the path P61. Therefore, the path P62 is selected as the second path.

In the present embodiment, the most congested link, the hot count and the total bandwidth utilization are sequentially considered. In other embodiments, the sequence of the most congested link, the hot count and the total bandwidth utilization can be changed.

Figure 7:
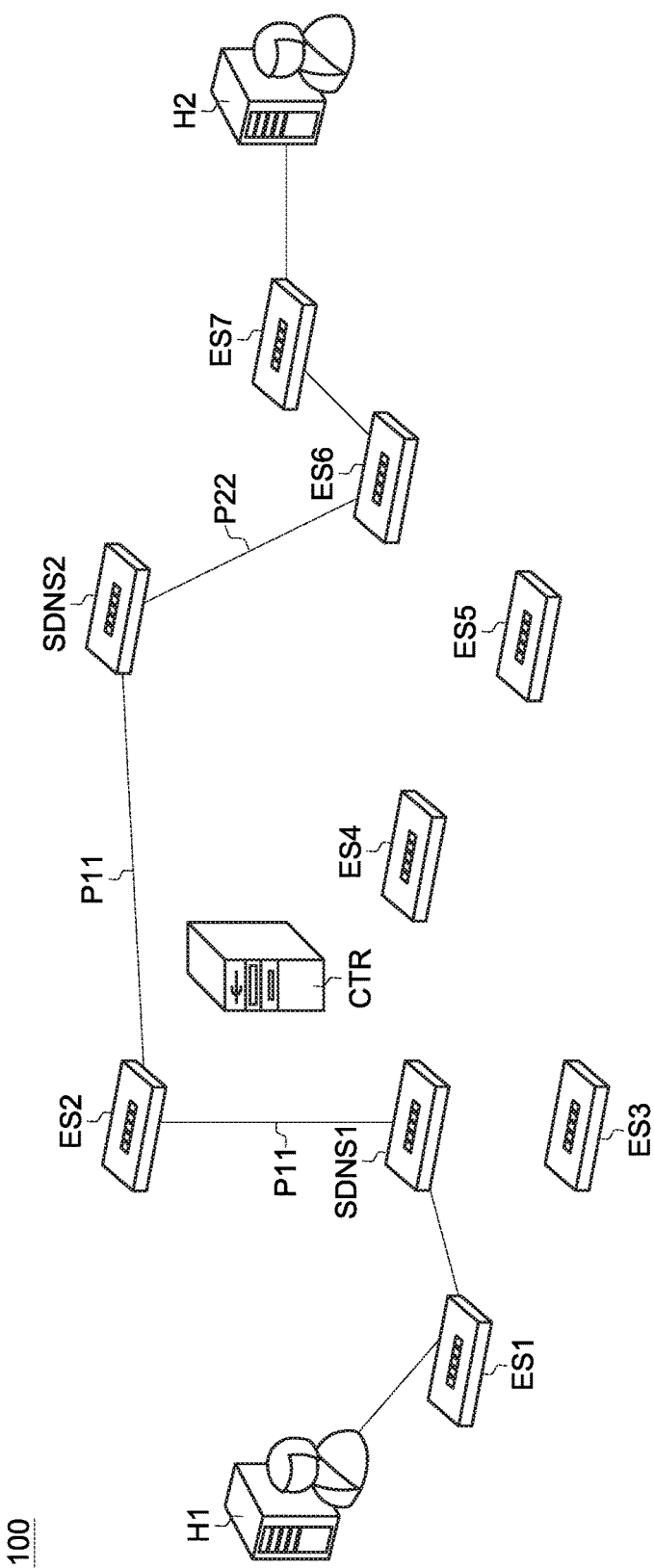
FIG. 7 shows the second path.

FIG. 7 shows the second path. If the link between the Ethernet switch ES4 and the SDN switch SDNS2 is disconnected or congested, the second path of FIG. 7 can be used for preventing the network congestion and achieving the dynamic load balance.

Figure 8:
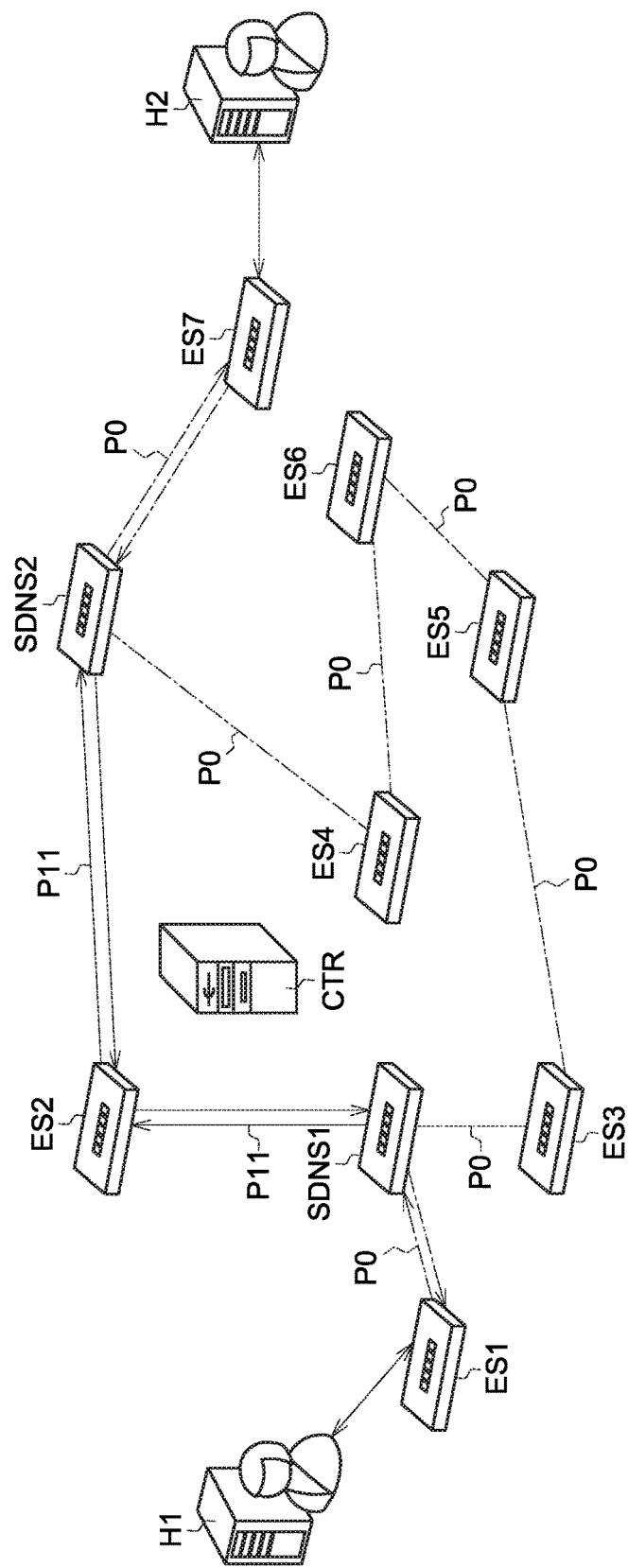
FIG. 8 shows the symmetric routing.

The change of path is illustrated as follow. FIG. 8 shows a symmetric routing. In the symmetric routing, the network controller CTR controls the forward path and the backward path to be the same. The default path P0 whose VLAN ID is "VLAN 10" is predetermined. The new path is the optional path P11 whose VLAN ID is "VLAN 20" starting at the SDN switch SDNS1. The forward path is a path form the first host H1 to the second host H2. The backward path is a path from the second host H2 to the first host H1.

In FIG. 8, the symmetric routing is formed between the SDN switch SDNS1 and the SDN switch SDNS2. The default path P0 is a path in the minimum spanning tree between the first host H1 and the second host H2. In this embodiment, the VLAN ID of the port of the first host H1 connected to the Ethernet switch ES1 is "VLAN 10." When the packet leaves the first host H1, there is no VLAN ID in the packet. When the packet arrives the Ethernet switch ES1, the packet is attached with "VLAN 10" and then delivered to the SDN switch SDNS1. In the present embodiment, there is no VLAN ID modification in the SDN switches SDNS1 and SDNS2 the packet follows the default path P0 toward destination host (the second host H2) along the SDN switch SDNS1, the Ethernet switch ES3, the Ethernet switch ES5, the Ethernet switch ES6, the Ethernet switch ES4, and the SDN switch SDNS2, in which VLAN ID is remained to be 10. Finally, the VLAN ID is removed before the packet departure from the Ethernet switch ES7 to the second host H2.

In FIG. 8, the default path P0 is used for transmitting the packet from the first host H1 to the second host H2, if the path is not changed. If the packet is transmitted to the SDN switch and it is determined that the path is needed to be changed, then the SDN switch changes the VLAN ID to the one that used by the new path and transmits the packet to the neighbor node of the new path. In FIG. 8, the optional path P11 between the SDN switch SDNS1 and the SDN switch SDNS2 is used. The optional path P11 corresponds to another minimum spanning tree. The VLAN ID of the optional path P11 is "VLAN 20."

The packet transmitted from the first host H1 to the second host H2 is transmitted along the default path P0 from the first host H1 to the SDN switch ES1. When the packet arrives the SDN switch SDNS1 at the first time, the SDN switch SDNS1 sends a pack-in message to the network controller CTR for querying how to deal with this packet since the SDN switch SDNS1 does not recognize this packet.

The network controller CTR selects a new path (i.e., optional path P11) according to the network state. The network controller CTR sets the flow entries of the SDN switch SDNS1 and the SDN switch SDNS2 as Table 2.

TABLE 2

| The flow entries of the SDN switch SDNS1 | | |
|---|---|---|
| Destination MAC address | VLAN ID | Actions |
| Second host H2 | VLAN 10 | Change the VLAN ID to be "VLAN 20" and deliver the packet to the port connected the SDN switch SDNS1 and the Ethernet switch ES2. |
| First host H1 | VLAN 20 | Change the VLAN ID to be "VLAN 10" and deliver the packet to the port connected the SDN switch SDNS1 and the Ethernet switch ES1. |
| The flow entries of the SDN switch SDNS2 | | |
| Destination MAC address | VLAN ID | Processing procedure |
| Second host H2 | VLAN 20 | Change the VLAN ID to be "VLAN 10" and deliver the packet to the port connected the SDN switch SDNS2 and the Ethernet switch ES7. |
| First host H1 | VLAN 10 | Change the VLAN ID to be "VLAN 20" and deliver the packet to the port connected the SDN switch SDNS2 and the Ethernet switch ES2. |

In Table 2, the four flow entries have been changed, such that the VLAN ID on the forward path is changed accordingly. When the packet arrives the SDN switch SDNS1, the VLAN ID of the packet is "VLAN 10." The VLAN ID is changed to 20 at the SDN switch SDNS1. When the packet arrives the Ethernet switch ES2, the VLAN ID of the packet is "VLAN 20." When the packet arrives the SDN switch SDNS2, the VLAN ID of the packet is "VLAN 20." The four flow entries of the SDN switch SDNS1 and the SDN switch SDNS2 can be set by the network controller CTR, when the SDN switch SDNS1 sends the first packet-in message to the network controller CTR. Therefore, the packet can be transmitted to the second host H2 without the flooding.

Moreover, when the packet goes through the SDN switch SDNS1 and the Ethernet switch ES2 and arrives the SDN switch SDNS2, the SDN switch SDNS2 sends the packet-in message to the network controller CTR for querying how to deal with this packet. Then, the network controller CTR sets the flow entries of the SDN switch SDNS2 as Table 2.

In FIG. 8, when the packet is transmitted from the first host H1 along the forward path, the backward path is already set by the network controller CTR. In the backward path, the packet is transmitted from the second host H2 to the SDN switch SDNS2 along the default path P0, and then the packet is transmitted to the SDN switch SDNS1 and the first host H1 along the optional path P11.

Figure 9:
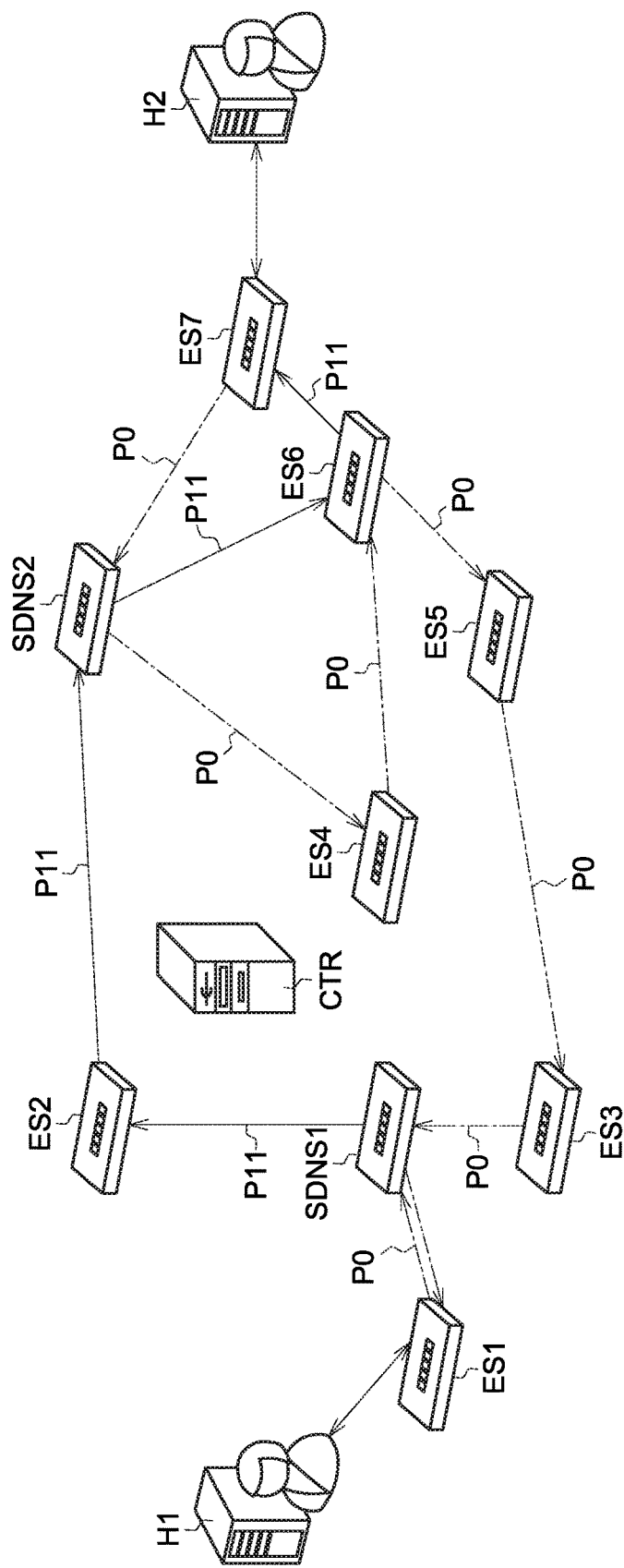
FIGS. 9 and 10 show the asymmetric routing.
Figure 10:
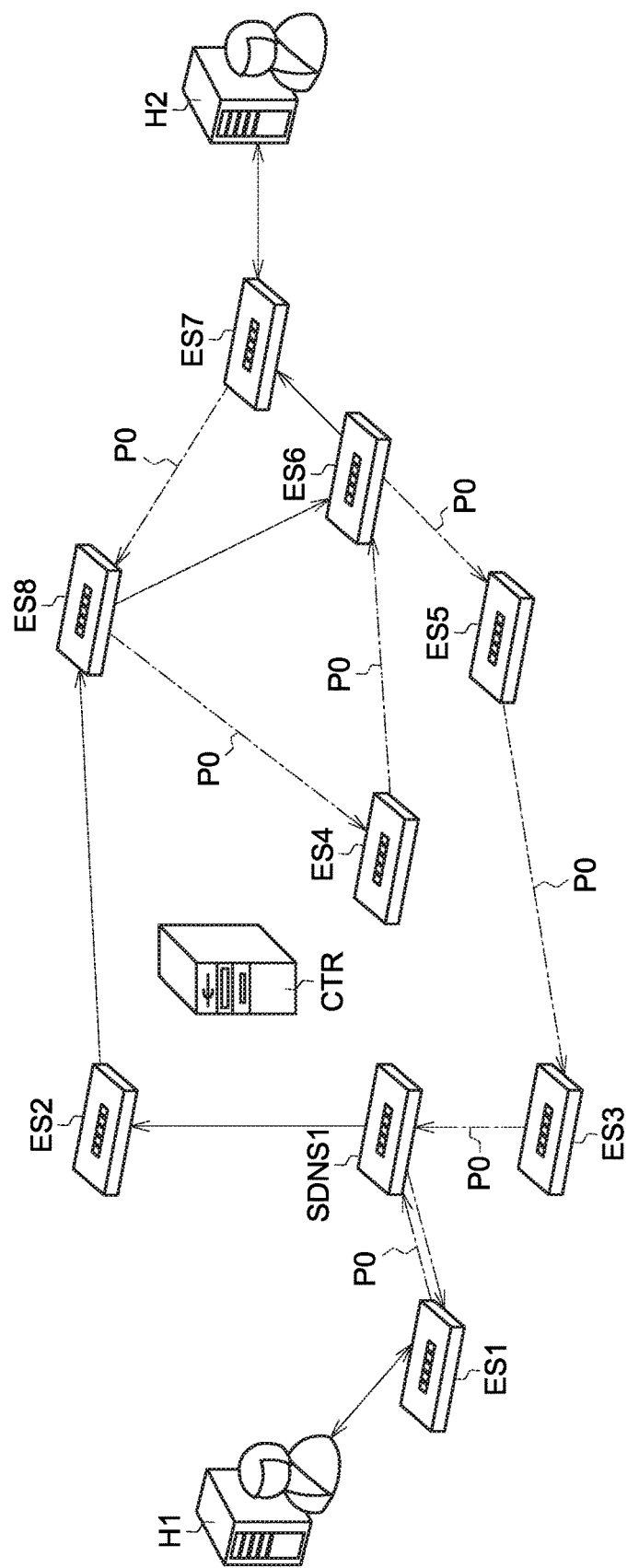

Further, please refer to FIGS. 9 and 10. FIGS. 9 and 10 show asymmetric routings. An asymmetric routing means the communication paths for the two directions between two hosts follow different routing paths. In other words, in asymmetric routing, the network controller CTR controls the forward path and the backward path to be different.

FIG. 9 shows an example of the asymmetric routing which is implemented in a system including the SDN switch SDNS1 and the SDN switch SDNS2. In the present embodiment, the first host H1 initiates a new flow destined to the second host H2. The default path P0 is a path from the first host H1 to the second host H2 according to the default path P0. In this embodiment, the packet leaves from the first host H1 does not include any VLAN ID. Because the ingress port is with VLAN 10, any packet comes from the first host H1 will be attached "VLAN 10 at the Ethernet switch ES1. As the first packet of the new flow arrives the SDN switch SDNS1, it triggers a packet in event at the SDN switch SDNS1 due to a table miss. The first packet of the flow is delivered to the network controller CTR to decide whether a routing change is needed. In the present embodiment, the network controller CTR decides no routing change is needed, new flow entries are set in the Table 3. It makes the routing follows the default path P0. Following the default path P0, when the packet arrives the Ethernet switch ES3, the VLAN ID of the packet is "VLAN 10." When the packet arrives the Ethernet switch ES5, the VLAN ID of the packet is "VLAN 10." When the packet arrives the Ethernet switch ES6, the VLAN ID of the packet is "VLAN 10." When the packet arrives the Ethernet switch ES4, the VLAN ID of the packet is "VLAN 10." When the packet arrives the SDN switch SDNS2, the VLAN ID of the packet is "VLAN 10." Since the Ethernet switch ES7 is the egress switch, when the packet arrives the Ethernet switch ES7, the VLAN ID of the packet is removed.

TABLE 3

The flow entries of the SDN switch SDNS1

| Destination MAC address | VLAN ID | Actions |
| --- | --- | --- |
| Second host H2 | VLAN 10 | Transmit along the default path P0. (Do not change the VLAN ID and deliver the packet to the port connected the SDN switch SDNS1 and the Ethernet switch ES3.) |
| First host H1 | VLAN 10 | Transmit along the default path P0. (Do not change the VLAN ID and deliver the packet to the port connected the SDN switch SDNS1 and the Ethernet switch ES1.) |

When the packet goes through the first host H1 and the Ethernet switch ES1 and arrives the SDN switch SDNS1, because the SDN switch SDNS1 does not recognize this packet, the SDN switch SDNS1 sends a pack-in message to the network controller CTR for querying how to deal with this packet.

In the present embodiment, the network controller CTR selects a new path (i.e., the optional path P11) according to the network state for congestion avoidance. The network controller CTR sets the flow entries of the SDN switch SDNS1 and the SDN switch SDNS2 as Table 4.

TABLE 4

| Destination MAC address | VLAN ID | Actions |
| --- | --- | --- |
| The flow entries of the SDN switch SDNS1 | | |
| Second host H2 | VLAN 10 | Change the VLAN ID to be "VLAN 20" and deliver the packet to the port connected the SDN switch SDNS1 and the Ethernet switch ES2. |
| First host H1 | VLAN 10 | Transmit along the default path P0. (Do not change the VLAN ID and deliver the packet to the port connected the SDN switch SDNS1 and the Ethernet switch ES1.) |
| The flow entries of the SDN switch SDNS2 | | |
| Second host H2 | VLAN 20 | Use the port connected the SDN switch SDNS2 and the Ethernet switch ES6. |
| First host H1 | VLAN 10 | Transmit along the default path P0. (Do not change the VLAN ID and deliver the packet to the port connected the SDN switch SDNS2 and the Ethernet switch ES4.) |

The first flow entry of the SDN switch SDNS1 and the first entry of the SDN switch SDNS2 have been changed, such that the VLAN ID on the forward path is changed accordingly. After the flow entries installed, the packet leaves the SDN switch SDNS1, the VLAN ID of the packet is "VLAN 20." When the packet arrives the Ethernet switch ES2, the VLAN ID of the packet is "VLAN 20." When the packet arrives the SDN switch SDNS2, the VLAN ID of the packet is "VLAN 20." When the packet arrives the Ethernet switch ES6, the VLAN ID of the packet is "VLAN 20." When the packet arrives the Ethernet switch ES7, the VLAN ID of the packet is removed. The two flow entries of the SDN switch SDNS1 and the SDN switch SDNS2 in Table 4 can be set by the network controller CTR after the SDN switch SDNS1 transmits the first packet-in message to the network controller CTR.

As shown in FIG. 9 and Table 4, when the packet is transmitted from the second host H2 to the first host H1 along the backward path, the packet goes through the second host H2 and the Ethernet switch ES7 and arrives the SDN switch SDNS2. The second flow entry of the SDN switch SDNS1 and the second flow entry of the SDN switch SDNS2 are transmitted along the default path P0, such that the backward path is the default path P0. Therefore, the forward path and the backward path are different and the asymmetric routing is formed.

However, because the forward path is changed, the Ethernet switches on the default path P0 which is the backward path does not know the MAC address of the first host H1 through the MAC leaning process of the Ethernet switches. The network controller CTR controls the SDN switch SDNS1 which is near the first host H1 to transmit the Layer 2 update message for informing the information of the first host H1 to the Ethernet switches on the default path P0. Therefore, the Ethernet switches can know the MCA address of the first host H1 for preventing broadcasting the packet.

When the path is changed, the network controller CTR can prevent from the flooding. After the network controller CTR changes the path, the backward path is different from the forward path. The network controller CTR controls the SDN switch SDNS1 to send the Layer 2 update message or one message which records the MCA address of the first host H1 to the default path P0 for updating the FIB of the Ethernet switches ES1 to ES7. The one or more SDN switches for sending the Layer 2 update message are located at the one or more crosses of the original path and the new path.

In another embodiment, an idle timeout is set at the flow entries of the SDN switch SDNS1. The time value of the idle timeout is less than that of the FIB of the Ethernet switches, such that the flow entry of the SDN switch SDNS1 can be removed before removing the FIB. If the flow entry is removed, the packet arrived the SDN switch SDNS1 transmits the package-in event to the network controller CTR and the network controller CTR sends the Layer 2 update message accordingly.

FIG. 10 shows an example of the asymmetric routing which is implemented in a system including the SDN switch SDNS1. In this embodiment, a new flow is generated from the first host H1. The destination node of the new flow is the second host H2. The SDN switches in the routing path do not change VLAN ID. It results in the packet following the default path P0 toward the second host H2. In this embodiment, there is only one SDN switch SDNS1 between the first host H1 and the second host H2. The packets generated from the first host H1 include no VLAN ID. The Ethernet switch ES1 is configured to attach VLAN 10 for any packet incoming from the port that connects to the first host H1. Thus, when the packet leaves the Ethernet switch ES1, the VLAN ID of the packet is "VLAN 10." As the first packet of the new flow arrives the SDN switch SDNS1, a packet in event is generated and the packet is delivered to the network controller CTR. The network controller CTR checks the network state and decides that there is no routing change for the new flow. The network controller CTR configures the flow entries as shown in Table 5. Following the default path P0, the next hop for the SDN switch SDNS1 is the Ethernet switch ES3. Since there is no VLAN ID change, the packet leaves the SDN switch SDNS1 with the VLAN ID without change. When the packet arrives the Ethernet switch ES3, the VLAN ID of the packet is "VLAN 10." When the packet arrives the Ethernet switch ES5, the VLAN ID of the packet is VLAN 10." When the packet arrives the Ethernet switch ES6, the VLAN ID of the packet is "VLAN 10." When the packet arrives the Ethernet switch ES4, the VLAN ID of the packet is "VLAN 10." When the packet arrives the Ethernet switch ES8, the VLAN ID of the packet is "VLAN 10." When the packet leaves the Ethernet switch ES7, the VLAN ID is removed.

TABLE 5

The flow entries of the SDN switch SDNS1

| Destination MAC address | VLAN ID | Actions |
| --- | --- | --- |
| Second host H2 | VLAN 10 | Transmit along the default path P0. (Do not change the VLAN ID and deliver the packet to the port connected the SDN switch SDNS1 and the Ethernet switch ES3.) |
| First host H1 | VLAN 10 | Transmit along the default path P0. (Do not change the VLAN ID and deliver the packet to the port connected the SDN switch SDNS1 and the Ethernet switch ES1.) |

In this embodiment, the SDN switch SDNS1 decides to change route for congestion avoidance. The network controller CTR selects a new path according to the network state. Refer to FIG. 10, if the link between the Ethernet switch ES3 and the SDN switch SDNS1 is disconnected or congested. The network controller CTR sets the flow entries of the SDN switch SDNS1 as Table 6 so as to bypass the link between the SDN switch SDNS1 and the Ethernet switches ES2 and ES3. In this embodiment, the VLAN ID of the port of the first host H1 connected to the Ethernet switch ES1 is "VLAN 10." The packets are attached with VLAN 10 at ingress Ethernet switch ES1. According to the flow entries in Table 6, the VLAN ID is changed to 20 at the SDN switch SDNS1. The packet is rerouted to the next hop node, the Ethernet switch ES2. It results in that the routing path behind SDNS1 to be the Ethernet switch ES8 and then to the Ethernet switch ES7. At the egress Ethernet switch ES7, the VLAN ID is removed due to the untag setting at each egress port for all of the switches inside the network. Finally, the packet without carrying any VLAN ID is sent to H2.

TABLE 6

The flow entries of the SDN switch SDNS1

| Destination MAC address | VLAN ID | Actions |
| --- | --- | --- |
| Second host H2 | VLAN10 | Change the VLAN ID to be "VLAN 20" and use the port connected the SDN switch SDNS1 and the Ethernet switch ES2. |
| First host H1 | VLAN10 | Transmit along the default path P0. (Do not change the VLAN ID.) |

According to the embodiments described above, a hybrid SDN-Ethernet system is provided. A plurality of links are formed among the Ethernet switches and the SDN switches. The network controller obtains a second path according to the network state, such that the dynamic load balance can be achieved.

Further, k optional paths can be obtained at each of the m SDN switches. When the packet arrives one of the SDN switches, the network controller can determine whether it is needed to change the path according to network state. The network controller can change the path by selecting one of the m×k optional paths or the default path if it is need. To be specific, the network controller is able to dynamically select route for a flow so as to achieve congestion avoidance and network load balancing. By m×k optional paths with different VLAN ID, in the exemplary embodiments of the disclosure may eliminate the issue of broadcast storm caused by routing change.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A network controlling method, comprising:
providing a hybrid SDN-Ethernet system including a plurality of hosts, a plurality of Ethernet switches and m Software-defined networking switches (SDN switches), wherein m is larger than or equal to 1;
obtaining a first path according to at least one default spanning tree in the hybrid SDN-Ethernet system;
obtaining m×k optional paths, wherein each of the m SDN switches is set as a beginning of each of k of the m×k optional paths; and
selecting a second path according to the m×k optional paths and the first path of the at least one default spanning tree.

2. The network controlling method according to claim 1, wherein each of the optional paths is assigned a Virtual Local Area Network identification (VLAN ID) which is recorded at all of a plurality of ports of each of the optional paths.

3. The network controlling method according to claim 1, wherein in the step of obtaining the m×k optional paths, the m×k optional paths are obtained according to a K-best paths algorithm, a K-shortest paths algorithm or a K-disjoint paths algorithm.

4. The network controlling method according to claim 1, wherein the m×k optional paths form m path layers, and two of the m path layers are connected via one of the m SDN switches.

5. The network controlling method according to claim 1, wherein in the step of selecting the second path, the second path is selected according to bandwidth utilization, the number of path hop count or a traffic engineering indices.

6. The network controlling method according to claim 1, further comprising:
replacing a current path by the second path, wherein each of the SDN switches sends a Layer 2 update message for updating a forwarding information base (FIB) of each of the Ethernet switches.

7. A network controller, disposed in a hybrid SDN-Ethernet system, wherein the hybrid SDN-Ethernet system includes a plurality of hosts, a plurality of Ethernet switches and m Software-defined networking switches (SDN switches), m is larger than or equal to 1, and the network controller comprises:
a processing unit, obtaining a first path according to at least one default spanning tree in the hybrid SDN-Ethernet system, obtain m×k optional paths, and select a second path according to the m×k optional paths and the first path of the at least one default spanning tree, wherein each of the m SDN switches is set as a beginning of each of k of the m×k optional paths; and
a storage unit, storing the m×k optional paths.

8. The network controller according to claim 7, wherein the processing unit assigns each of the optional paths a Virtual Local Area Network identification (VLAN ID) which is recorded at all of a plurality of ports of each of the optional paths.

9. The network controller according to claim 7, wherein the processing unit obtains the m×k optional paths according to a K-best paths algorithm, a K-shortest paths algorithm or a K-disjoint paths algorithm.

10. The network controller according to claim 9, wherein the m×k optional paths form m path layers, and two of the m path layers are connected via one of the m SDN switches.

11. The network controller according to claim 7, wherein the processing unit selects the second path according to bandwidth utilization, the number of path hop count or a traffic engineering indices.

12. The network controller according to claim 7, wherein the processing unit selects the second path according to an Integer Linear Programming Algorithm (ILP Algorithm), a min-max fairness algorithm (MMF algorithm), a Fully Polynomial Time Approximation Scheme Algorithm (FPTAS Algorithm).

13. The network controller according to claim 7, wherein the processing unit further replaces a current path by the second path, and controls each of the SDN switches to send a Layer 2 update message for updating a forwarding information base (FIB) of each of the Ethernet switches.

* * * * *